March 1, 1966     T. W. RATCLIFFE     3,237,252
MOLD CLAMPING DEVICES
Filed Oct. 1, 1963     2 Sheets-Sheet 1
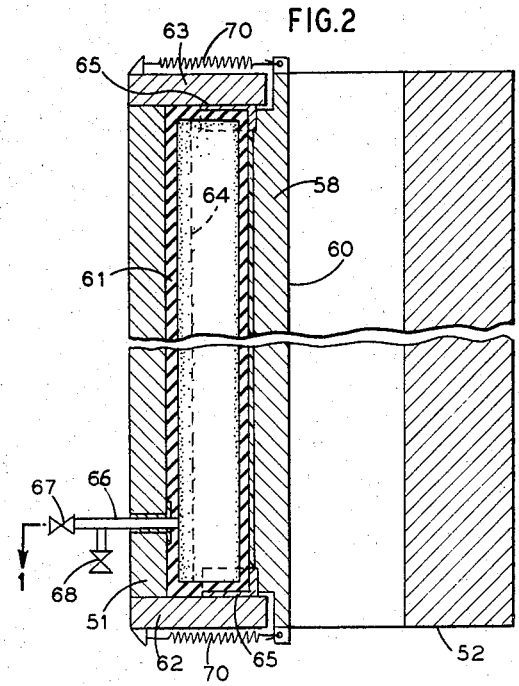
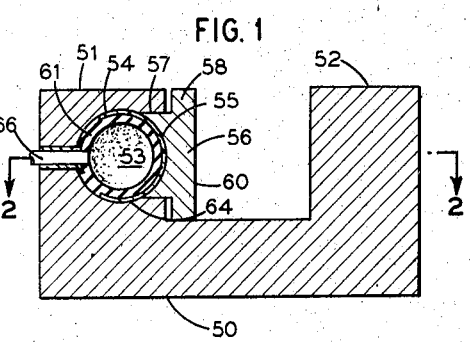
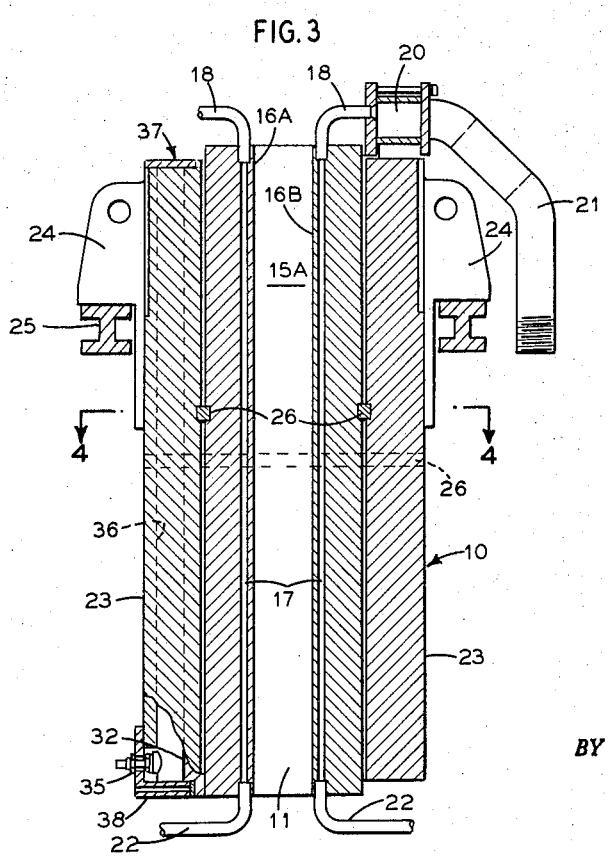
INVENTOR.
Temple W. Ratcliffe
BY
ATTORNEY March 1, 1966     T. W. RATCLIFFE     3,237,252
MOLD CLAMPING DEVICES Filed Oct. 1, 1963     2 Sheets-Sheet 2

INVENTOR.
Temple W. Ratcliffe
BY
ATTORNEY

United States Patent Office 3,237,252
Patented Mar. 1, 1966

3,237,252
MOLD CLAMPING DEVICES
Temple W. Ratcliffe, Beaver, Pa., assignor to The Babcock & Wilcox Company, New York, N.Y., a corporation of New Jersey
Filed Oct. 1, 1963, Ser. No. 313,112
3 Claims. (Cl. 22—57.2)

The present invention relates to a pneumatic or hydraulic clamping device where substantially uniform pressures are applied throughout the length and width of an elongated surface, and more particularly to a clamping device capable of exerting a substantially uniform clamping pressure on an elongated workpiece.

Previous clamping devices of extended length and/or width required multiple points of pressure application and depended upon a heavy beam-like member to distribute the locally applied pressure between the points of application. The slightest bending of this beam resulted in the clamping pressure being non-uniform along the extended length of the clamping device. Where high clamping pressures are desired, the beam transmitting the pressure must be extremely heavy in section to avoid deflection and subsequent application of uneven clamping pressures. In addition, the external space requirements for multiple hydraulic or pneumatic cylinders, or the like, serving as sources of the clamping force, was excessive and costly. In any clamping device utilizing a number of such cylinders, an additional disadvantage lies in the excessive piping costs required to connect the multiple units to a common pressure source.

In accordance with the invention an elongated workpiece or other member to be clamped in position is located between a fixed surface and a movable surface where the latter is uniformly urged into clamping position by a resilient pressure member which is elongated in the same direction as that of the workpiece. The resilient pressure member may be constructed in the form of a bag or bladder which is inflated by a pneumatic or hydraulic fluid. Advantageously the clamping device may be of elongated form and may be constructed for high pressure operation so as to apply a substantially uniform selected clamping force throughout the length of an elongated workpiece or other member.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 1 is an elevation, in section, of a clamp constructed in accordance with the invention;

FIG. 2 is a section view taken on line 2—2 of FIG. 1;

FIG. 3 is an elevation, in section of a continuous casting mold incorporating the clamp of the present invention;

Figure 4:
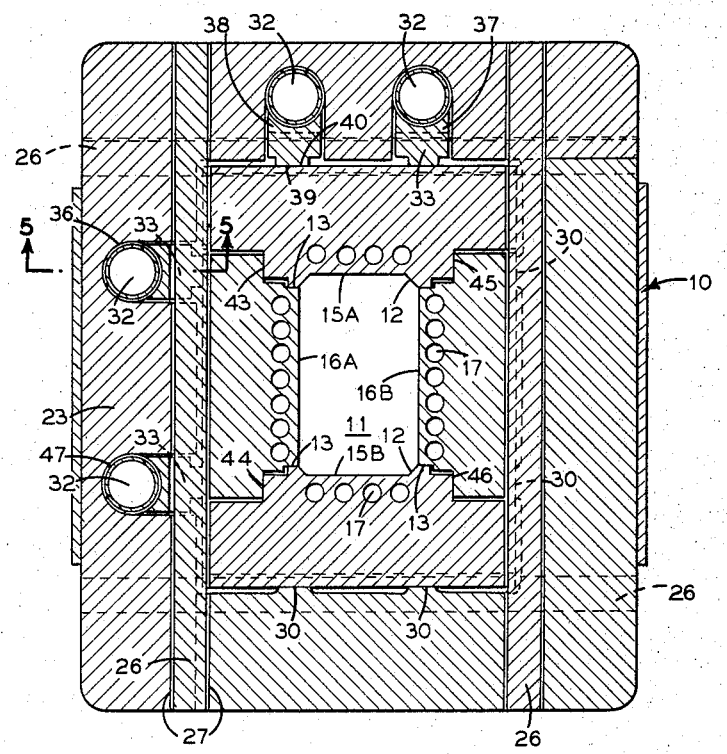
FIG. 4 is an enlarged section taken on line 4—4 of FIG. 3.

In the embodiment of the invention shown in FIGS. 1 and 2, a clamping or work-holding device is provided for use in positioning an elongated workpiece during finishing by grinding or milling, for example. The clamp is particularly applicable for use with non-magnetic materials such as ceramic refractory materials or stainless steel elements since the force exerted by the clamp may be at a low pressure when used in connection with fragile materials or at higher pressure when used with more rugged workpieces. Regardless of the pressure used, the pressure applied to the workpiece will be substantially uniform throughout the length of the clamp.

As shown specifically in FIGS. 1 and 2, the clamping device includes a member 50 having a pair of spaced projecting members or flanges 51 and 52 attached thereto. The facing surfaces of the flanges are parallel, substantially coextensive, and one dimension is many times that of the other dimension. While the flanges 51 and 52 are shown as formed integrally with the connecting member 50 so that the transverse spacing therebetween is fixed, the flanges may be detachably secured for an adjustable spacing therebetween.

One of the flanges 51 is machined throughout its length to form a U shaped recess 53 opening through the face of the flange and having the axis of the recess normal to the face surface of the flange 51. The recess 53 has a semi-cylindrical bottom 54 which cooperates with the semi-cylindrically recessed end 55 of a plunger or elongated piston 56. The piston 56 is constructed with shank 57 slidably fitted to the parallel sides of the recess 53, and a head 58 having a surface 60 which is substantially normal to the axis of the recess and parallel to the face of the flange 52.

A flexible bag or bladder 61 is constructed of rubber or the like in the shape of a closed cylinder to conform generally in the shape of the recess 53, both in cross-section and in length. In the embodiment of FIG. 2, the ends of the recess 53 are closed by plates 62 and 63 and the opposite end portions of the piston 56 are extended to overlay the plates 62 and 63. It will be understood that the recess 53 may be so machined as to form integral end closures so that plates 62 and 63 would not be required, and that the lengths of the recess, the face 60 of piston 56 and the face of flange 52 may all correspond, if desired.

With the construction shown, expansion of the bag or bladder 61 by the application of fluid pressure thereto will push the piston 56 outwardly of the recess and toward the flange 52. Under these conditions the bladder would tend to extrude between the sliding surfaces between the parallel walls of the recess and the surfaces of the shank of the piston. The bladder might also pinch and be ruptured during retraction of the piston 56. To prevent such adverse effects on the bladder, a gasket 64, made of rubber impregnated nylon or the like, is interposed between the end of the piston and the bladder. The gasket extends beyond the end of the piston and bears on the bottom of the recess. It is advantageous for the gasket to cover at least 200 degrees of the cylindrical surface of the bladder. In a similar manner the opposite ends of the bladder 61 are each protected by a metal cap 65 (see FIG. 2) positioned between the bladder and the end plates 62 and 63 to prevent bladder extrusion and/or rupture at these locations.

As shown, the bladder is provided with a hollow stem 66 opening to the interior of the bladder 61 and having valves 67 and 68 therein to regulate the introduction or removal of pressure fluid to and from the bladder, respectively. If desired, as shown, the piston 56 may be provided with springs 70 at opposite ends thereof so as to release the clamping effect of the piston when fluid pressure is removed from the bladder 61.

Figure 5:
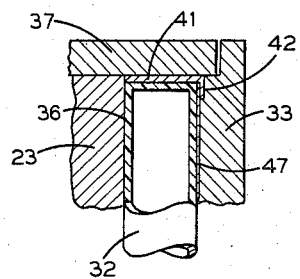
FIG. 5 is a fragmentary section taken on line 5—5 of FIG. 4.

A modified arrangement, and use, of the clamp of the present invention is shown in FIGS. 3, 4 and 5, where the clamp is applied to a continuous casting mold 10. As shown particularly in FIG. 4, the open ended cavity 11 of the mold is rectangular in cross section, with beveled corners. The end and side walls 15A and 15B, and 16A and 16B, respectively, of the mold are each formed from a separate block of metal which is machined to the desired contour, with the joints 13 therebetween positioned in abutting relationship in the mold assembly.

Fluid flow passageways 17 are formed in the blocks defining the walls of the mold, with cooling fluid introduced to each of the passageways 17 through an elbow 18 from a manifold 20 which in turn is supplied from a supply pipe 21 (see FIG. 3). The cooling fluid discharges from the passageways 17 through pipes 22 which are directed outwardly from the axis of the mold 10.

The mold is assembled in a basket or support member 23 which is rigidly mounted upon a structural supporting frame. As shown particularly in FIGS. 3 and 4, the support member 23 is provided with brackets 24 which rest directly upon cross beams 25 (see FIG. 3), or the like, forming part of the supporting structural steelwork (not shown). The mold walls 15 and 16 have their exterior surfaces spaced from the interior surfaces of the member 23 and are supported in vertical relationship to the member 23 by four horizontally disposed keys 26 each of which fit in a keyway 27 formed partially in the exterior portion of the mold walls 15 and 16, and partially in the interior portion of the support member 23. The keyways 27 are machined to form a tight fit with the keys 26 in the vertical dimension. Thus with the keys in place, the mold walls will have vertical movement from the level of the keys 26 as may be caused by thermal changes. The keyways 27 are each cut so as to loosely fit the keys 26 in a horizontal direction, thus permitting controlled horizontal movement of the mold walls 15 and 16 relative to the support members 23, as restrained by the inventive clamping arrangement hereinafter described.

Due to the movements of the mold liner blocks 15 and 16, resulting from thermal forces developed in the walls during operation of the mold, it is necessary to maintain the joints 13 between the mold wall sections tight so as to avoid escape of molten metal therebetween. As shown particularly in FIG. 4, one of the side blocks 16B and one of the end blocks 15B of the mold assembly are each maintained in abutting relationship with the adjoining surfaces of the frame 23, while the blocks 15A and 15B are each provided with a compressive or clamping means intended to maintain the mold wall blocks in abutting relation and the joints 13 between the mold blocks in a closed condition. At the same time the compressive or clamping means permits restrained horizontal movement of the parts as caused by thermal changes with the blocks.

While the mold blocks 15B and 16B horizontally abut the supporting frame 23 on the vertical surfaces 30, see FIG. 4, the opposing mold blocks 15A and 16A are provided with pneumatic or hydraulic bladders 32 which activate piston-like vertically extending members 33 intended to force the mold block assembly towards the fixed surfaces 30 of the mold support member 23.

As described in connection with FIGS. 1 and 2, the compressive means or bladders 32 are each formed as a cylinder of elastic material, such as rubber or nylon corded rubber, and extend substantially the full length of the mold 10. As shown in FIG. 3, each bladder 32 is provided with an inlet connection 35 connected with a common source of pressure fluid such as a fluid reservoir (not shown) so that the pressure imposed on the bladders 32 may be regulated and the pressure in each bladder will be equal. Under some circumstances it may be desirable to impose different or unequal pressure on different bladders, but ordinarily the fluid pressure supplied to each bladder 32 will be equal whether the fluid is compressible or non-compressible.

As shown, each of the bladders is positioned in a recess 36 formed in the inner portion of the member 23. The recess is semi-cylindrical in shape with straight sides normal to and extending to the inner face of the member. As shown in FIGS. 3 and 5, the upper and lower ends of each recess 36 is closed by plate members 37 and 38, respectively, attached to the ends of the member 23. The piston 33 extends the full length of the recess between the plates 37 and 38 and is fitted for sliding motion in a horizontal direction relative to the straight side walls of the recess 36. The inner or recess side 37 of the piston 33 is curved in semi-cylindrical shape to generally conform with the curvature of the bladder, while the opposite end 38 of each piston is provided with flat surface 40 (see FIG. 4) to bear upon a parallel surface located on the outer side 39 of the mold block 15A or 16A. Each piston is provided with a slotted groove (not shown) intermediate the length so as to permit horizontal movement thereof at the level of the corresponding key 26.

The recesses 36 are positioned in the frame 23 adjacent the blocks 15A and 16A, with two of such recesses provided for each of the movable blocks. The recesses are horizontally spaced so that the force of each piston is exerted generally in a direction in alignment with the mold face of an adjoining mold block. For example, the pistons 33 acting on the block 15A forces the block against the end surfaces of the blocks 16A and 16B and through the latter blocks against the surfaces of the block 15B. Thus the pressure exerted on the block 15A closes the joints 13 adjacent the corners of the mold cavity. In a similar arrangement the pistons 33 engaging the block 16A are each generally aligned with the faces of the blocks 15A and 15B so that the pressure exerted on the block 16A forces the latter block against the surfaces 43 and 44 of the blocks 15A and 15B, respectively, and in turn through the surfaces 45 and 46 against the block 16B and its supporting surfaces 30.

It will be recognized that while the bladders 32 are each substantially enclosed in a cylindrical recess 36 formed by the wall of the support frame 23, and the curved side 37 of the piston 33, the ends of the bladder must necessarily be provided with metallic caps 41, similar to the caps 65 of FIG. 2, so as to prevent rupture of the bladder during movement of the piston relative to the support member. Such a construction is illustrated in FIG. 5 wherein the upper end of the bladder 32 is provided with a metallic cap member 41 extending across the end of the bladder and having a depending flange portion 42 which encloses approximately 180° of the upper cylindrical end portion of the bladder. The depending flange of the cap member is located so as to overlay the gap between the recess in the frame and the face of the elongated piston. The construction at the lower end of the bladder is similar to that of the upper end. In a similar manner, a gasket 47 of nylon or the like is positioned between the bladder 32 and the end of the piston 33 to protect the bladder from rupture by pinching or extrusion during movement of the piston in the recess 36. The gasket 47 advantageously extends the full length of the bladder and encompassess 200 or more degrees of the bladder surface. The gasket 47 is similar to the gasket 64 of FIGS. 1 and 2.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A substantially upright open end fluid cooled mold comprising a plurality of separate metallic members defining the opposite side and end walls of said mold, means for fluid cooling each of said members, a rigid hollow frame enclosing said members in spaced relationship, means for supporting said members in said frame at a vertically fixed position, one side and one end member of said mold abutting the adjoining surface of said frame, and means for imposing a vertically uniform horizontal pressure on the other end and side members of said mold including horizontally spaced vertically elongated recesses in said frame opening to the adjacent other end and side members of said mold, a deformable pressure retaining bladder in each of said recesses, a piston within each of said recesses and horizontally operable in the recess to engage one of said other members, the piston having a vertical cross-section essentially equal to that of the recess and having its surface facing the recess having essentially the same configuration as that of the bladder, a one piece gasket positioned between the bladder and the piston and covering the surfaces between the back side of said piston and the facing portion of said recess, and means for supplying pressure fluid to said bladders to exert substantially uniform pressure on said metallic members to maintain said mold in assembly during operation.

2. A fluid cooled mold according to claim 1 wherein the frame side of said recesses are each curved through its vertical extend to essentially the same configuration as that of the bladder.

3. A fluid cooled mold according to claim 1 wherein said means for supporting said members in the frame includes a horizontally disposed key engaging a key way formed in each of said side and end walls and the facing surfaces of said frame.

References Cited by the Examiner
UNITED STATES PATENTS

| | | | |
|---|---|---|---|
| 200,986 | 3/1878 | Carty | 18—43 |
| 1,312,615 | 8/1919 | Cooper. | |
| 1,634,047 | 6/1927 | Smith. | |
| 2,365,482 | 12/1944 | Manken et al. | 18—12 |
| 2,730,783 | 1/1956 | Kennison. | |
| 2,737,998 | 3/1956 | Meanor et al. | |
| 2,987,770 | 6/1961 | Powell | 18—43 XR |
| 3,075,264 | 1/1963 | Wognum | 22—57.2 XR |
| 3,091,804 | 6/1963 | Gerard et al. | |
| 3,093,862 | 6/1963 | Gerard et al. | |
| 3,112,527 | 12/1963 | Pankratz et al. | 18—12 |
| 3,118,177 | 1/1964 | Von Platen. | |

J. SPENCER OVERHOLSER, *Primary Examiner.*

WILLIAM J. STEPHENSON, *Examiner.*